(12) United States Patent
Aso et al.

(10) Patent No.: US 7,891,267 B2
(45) Date of Patent: Feb. 22, 2011

(54) AT SELECTOR COVER

(75) Inventors: Yusuke Aso, Hiratsuka (JP); Tomohiro Takahira, Shizuoka-ken (JP)

(73) Assignees: Nissan Motor Co., Ltd., Yokohama-shi (JP); Fuji Kiko Co., Ltd., Kosai-shi (JP)

( * ) Notice: Subject to any disclaimer, the term of this patent is extended or adjusted under 35 U.S.C. 154(b) by 216 days.

(21) Appl. No.: 11/602,271

(22) Filed: Nov. 21, 2006

(65) Prior Publication Data

US 2007/0137363 A1   Jun. 21, 2007

(30) Foreign Application Priority Data

Nov. 25, 2005  (JP)  ............................. 2005-340998
Sep. 14, 2006  (JP)  ............................. 2006-249868

(51) Int. Cl.
*F16H 63/42* (2006.01)
*B60K 20/04* (2006.01)

(52) U.S. Cl. ................. 74/473.18; 74/473.3; 74/473.33; 116/28.1

(58) Field of Classification Search ................ 74/473.3, 74/473.18, 473.29, 471 XY; 116/28.1; 340/456; 362/491
See application file for complete search history.

(56) References Cited

U.S. PATENT DOCUMENTS

| | | | |
|---|---|---|---|
| 4,980,803 A | 12/1990 | Richmond et al. | |
| 5,540,180 A * | 7/1996 | Kataumi et al. | 116/28.1 |
| 5,855,182 A * | 1/1999 | Kline et al. | 116/28.1 |
| 5,862,708 A * | 1/1999 | Shamoto | 74/473.18 |
| 5,979,263 A * | 11/1999 | Tomida et al. | 74/473.3 |
| 6,044,790 A * | 4/2000 | Murakami | 116/28.1 |
| 6,182,530 B1 * | 2/2001 | Hattori et al. | 74/566 |
| 6,622,583 B2 * | 9/2003 | Wang | 74/473.2 |
| 2005/0000310 A1 | 1/2005 | Yamamoto et al. | |

FOREIGN PATENT DOCUMENTS

| | | |
|---|---|---|
| JP | 8-192653 A | 7/1996 |
| JP | 2005-001401 A | 1/2005 |
| JP | 2005-125990 A | 5/2005 |

* cited by examiner

*Primary Examiner*—Richard W Ridley
*Assistant Examiner*—Thomas Diaz
(74) *Attorney, Agent, or Firm*—Foley & Lardner LLP

(57) ABSTRACT

An AT selector cover is disclosed having a base member having a select gate for an automatic mode and a manual mode gate formed along a vehicle's longitudinal direction, a first slide plate slidably held on the base member for sliding capability in the vehicle's longitudinal direction, and a second slide plate held on the first slide plate for sliding capability in a vehicle's lateral direction, wherein the second slide plate has a guide member protruding toward the base member, which has a guide recess for guiding the guide member, movable with the shift lever, which is inserted to the guide recess.

18 Claims, 4 Drawing Sheets

AT SELECTOR COVER

BACKGROUND OF THE INVENTION

The present invention relates to an AT selector cover having an indicator for mechanically providing clear indication of a select position of a shift lever.

In recent years, an AT selector cover has heretofore been known with a structure having a select gate for an automatic mode, a manual mode gate and an indicator. As disclosed in a Japanese Unexamined Patent Application Laid-Open Publication No. 2005-1401, the AT selector cover is capable of permitting the shift lever to move between the select gate and the manual mode gate in operation.

SUMMARY OF THE INVENTION

The AT selector cover, set forth above, comprises a first slide plate operative to move with the shift lever displaced in the select gate in a vehicle's longitudinal direction, and a second slide plate operative to move with the shift lever displaced in a vehicle's lateral direction. The second slide plate is fitted to the first slide plate for sliding capability in the vehicle's lateral direction and moves with the first slide plate displaced in the vehicle's longitudinal direction during the trailing movement of the first slide plate in the vehicle's longitudinal direction.

However, since the second slide plate is held in the first slide plate, the second slide plate is caused to vibrate during running of a vehicle and the second slide plate interferes with a peripheral component part with a fear of the occurrence of interfering noise. Also, during operation (during a shift from the select gate to the manual gate) of the shift lever in the vehicle's lateral direction, there is a fear with the occurrence of abnormal noise due to interference between the second slide plate and another peripheral component part.

A need arises for a cushioning material such as non woven fabric to be mounted when preventing such interfering noise or abnormal noise. This results in the occurrence of issues such as an increase in cost and an increase in assembling man-hour.

It is, therefore, an object of the present invention to provide an AT selector cover that includes a select gate, a manual mode gate and an indicator with no occurrence of interfering noise or abnormal noise.

The present invention provides an AT selector cover comprising:

a base member having a select gate for an automatic mode and a manual mode gate formed along a vehicle's longitudinal direction;

a first slide plate held on the base member for sliding capability in the vehicle's longitudinal direction and available to move with a shift lever moving within the select gate;

a second slide plate held in the first slide plate for sliding capability in a vehicle's lateral direction and available to move with the shift lever moving in the vehicle's lateral direction; and an indicator clearly indicating a select position of the shift lever on a side area of the select position;

wherein the shift lever is capable of shifting between the select gate of the automatic mode and the manual mode gate; and the second slide plate has a guide member protruding toward the base member and the base member has a guide recess through which the guide member movable with the shift lever is guided and in which the guide member is inserted.

With the AT selector cover according to the present invention, since the guide member, formed on the second slide plate, is inserted to the guide recess formed in the base member, the vibration of the second slide plate is restricted during running of a vehicle. Accordingly, this enables the prevention of the occurrence of interfering noise due to interference between the second slide plate and a related peripheral component part.

Further, the second slide plate is slidably held with the first slide plate, thereby precluding the occurrence of abnormal noise due to interference between the first slide plate and the second slide plate.

In addition, abnormal noise, resulting from vibration of the second slide plate, can be avoided regardless of selected positions of the shift lever.

DETAILED DESCRIPTION OF THE PREFERRED EMBODIMENTS

Figure 1:
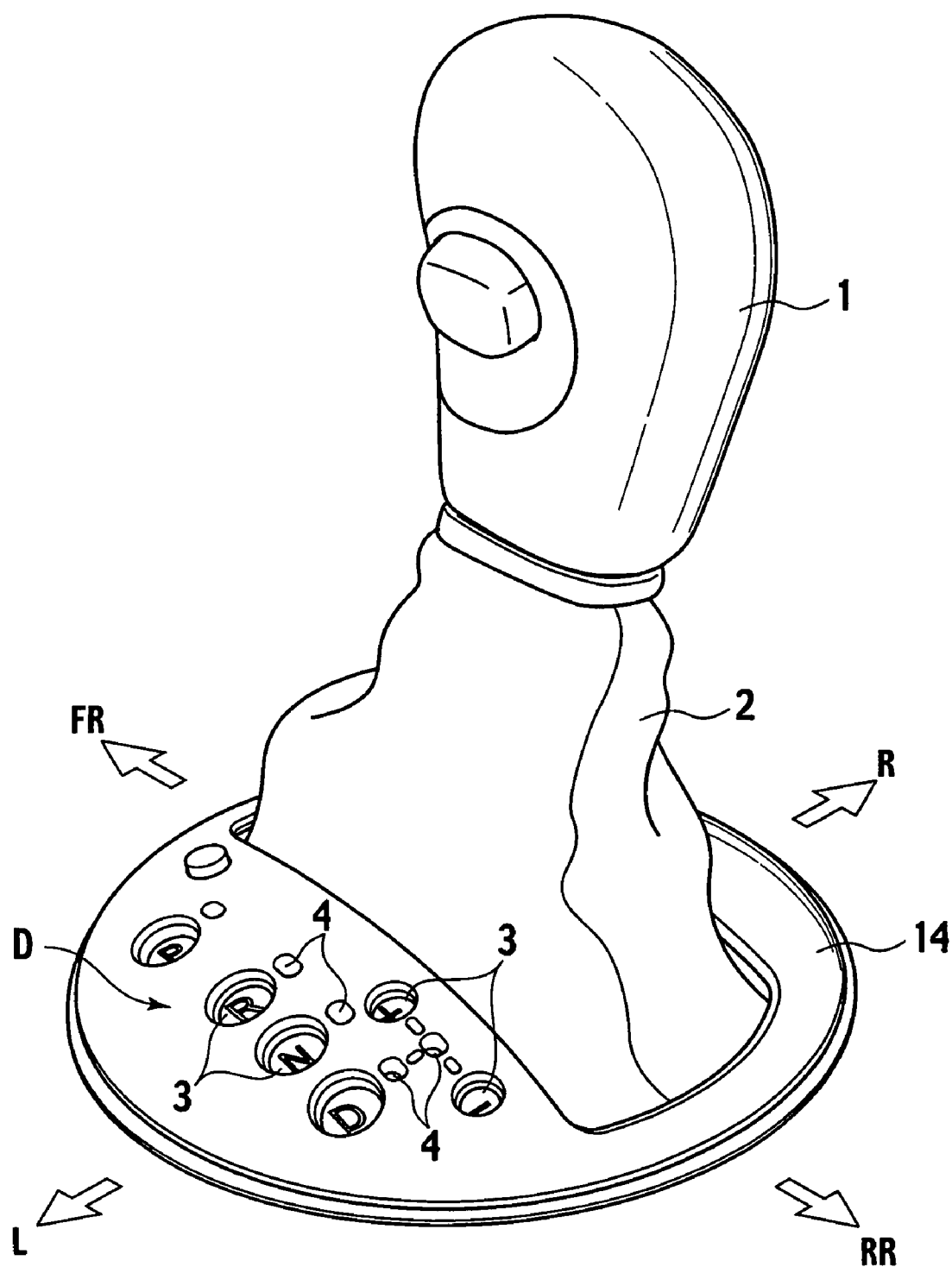
FIG. 1 is a perspective view showing an outer appearance of an AT selector cover of one embodiment according to the present invention.

Now, an AT selector cover of a concrete embodiment according to the present invention is described with reference to the accompanying drawings. The AT selector cover of the present embodiment includes an indicator, located in an area closer to a driver's seat with respect to a shift lever, which acts as a component part for use in a left hand drive car. The AT selector cover is disposed on a floor console section at an area near the driver's seat that is not shown. Also in the following description, it is to be understood that such reference characters "R", "L", "FR" and "RR" refer to "a vehicle's rightward direction", "a vehicle's leftward direction", "a vehicle front" and "a vehicle rear", respectively.

Figure 2:
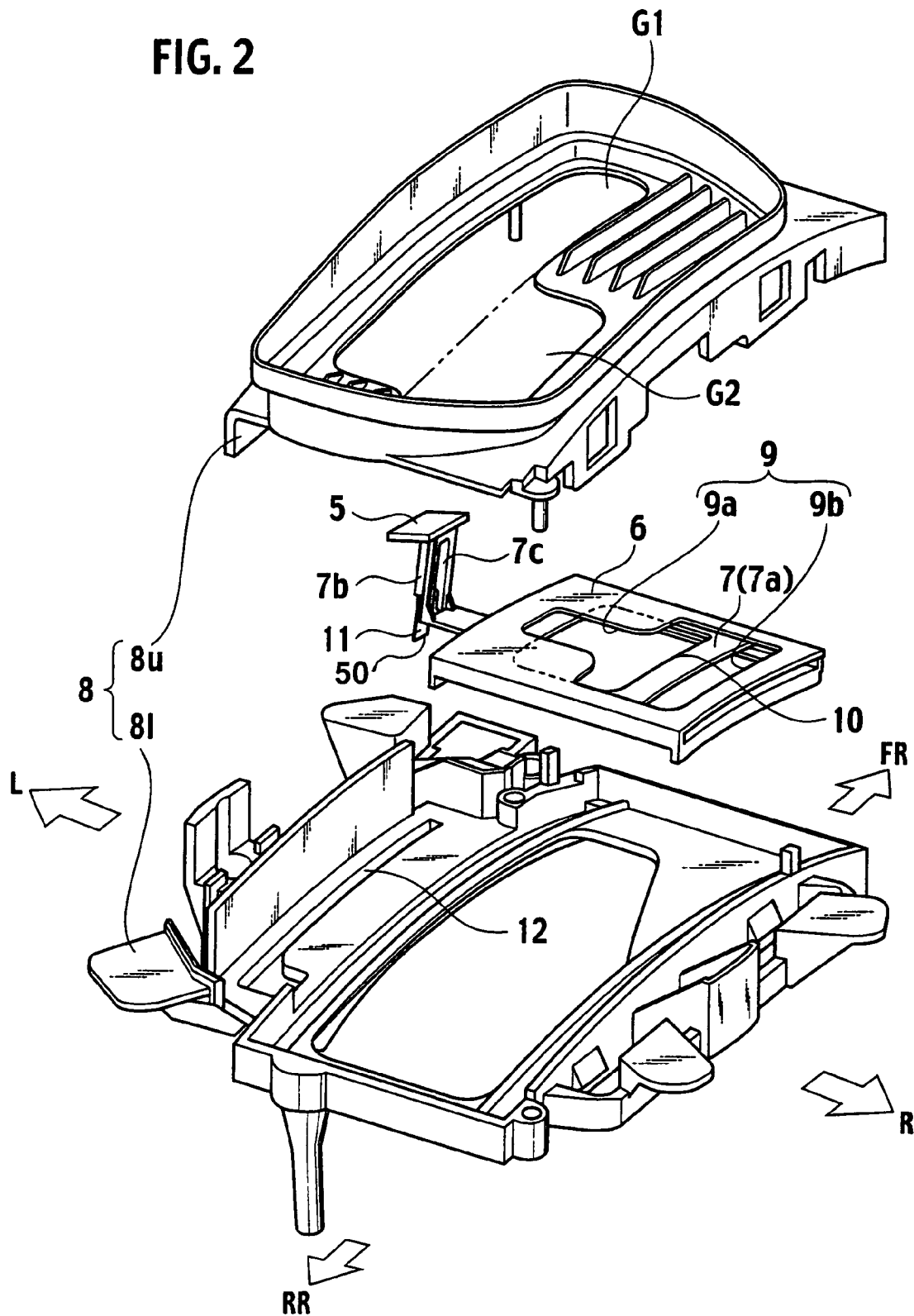
FIG. 2 is an exploded perspective view showing first and second slide plates and a base member forming the AT selector cover of one embodiment according to the present invention.

FIG. 1 is a perspective view of an external appearance of a first embodiment according to the present invention. Further, FIG. 2 is an exploded perspective view showing first and second slide plates and a base member forming the AT selector cover of the first embodiment according to the present invention. For use with the AT selector cover of the present embodiment, a shift lever 1 can be actuated in both of a select gate G1 of an automatic mode (for "P", "R", "N" and "D" ranges) disposed in a vehicle's longitudinal direction and a manual mode gate G2 of a manual mode (see FIG. 2).

In addition, shifting the shift lever 1, placed in the "D" range, rightward enables the shift lever 1 to shift from the select gate G1 to the manual mode gate G2. Moreover, in the manual mode gate G2, moving the sift lever 1 up to the vehicle front allows a gear shift-up to be initiated and moving the sift lever 1 down to the vehicle rear allows a gear shift-down to be initiated.

Also, in FIG. 1, a shift boot 2 covers the gates per se to render tile same to be invisible. However, the indicator D, representing select positions in respective ranges, is located near the shift lever 1 on a left side of the vehicle and the indicator D has the same arrangement with the respective ranges as that of the gates. With the indicator D, the gear shift-up in the manual mode is indicated in a mark "+" and the gear shift-down is indicated in a mark "−".

The indicator D includes a mark display section 3, indicating the respective ranges, and windows 4 formed on a side of a line of the respective ranges. The window 4 is provided with a display of a display portion in a red color shown in FIG. 2. In the manual mode (with a position of the shift lever 1 in this mode will be hereinafter referred to as an M-range), one window 4 is placed in an area between the marks "+" and "−".

Among the plural windows 4, the window 4, through which the red-colored display portion 5 is visible, provides an indication on a select position of the shift lever 1. Especially, with the shift lever 1 of the present embodiment, the select position is indicated by means of the indicator D because the gates per se are hidden with the shift boot 2 as mentioned above with incapability of directly viewing the position of the shift lever 1 in the gate.

Next, description is made of a mechanism in which the display portions 5 are displayed on the respective windows 4, described above, in correlation with the select positions of the shift lever 1.

As shown in FIG. 2, the AT selector cover 14 of the present embodiment comprises a first slide plate 6 movable with the shift lever 1 displaced in the select gate G1 (automatic mode) in the vehicle's longitudinal direction, and a second slide plate 7 movable with the shift lever 1 displaced (for shifting movement from the select gate G1 to the manual mode gate G2) in a vehicle's lateral direction. The second slide plate 7 is fitted in place for sliding capability in the vehicle's lateral direction with respect to the first slide plate 6 and, during subsequent movement of the first slide plate 6 in the vehicle's longitudinal direction, the second slide plate 7 moves with the first slide plate 6 in the vehicle's longitudinal direction.

As shown in FIG. 2, the base member 8 comprises a base floor 8*l* and a base upper 8*u*.

The first slide plate 6 and the second slide plate 7, fitted to the first slide plate 6, are mounted inside the base member 8 for sliding capabilities in the vehicle's longitudinal direction. That is, the first slide plate 6 and the second slide plate 7 are pinched between the base floor 8*l* and the base upper 8*u* and mounted on the base member 8 for sliding capabilities.

The first slide plate 6 has a first through-bore 9. The shift lever 1 passes through the first through-bore 9. The first through-bore 9 takes the form of a laid-down character T and has a narrow width portion 9*a* narrow in width in the vehicle's longitudinal direction and a large width portion 9*b* greater in width. The narrow width portion 9*a* is located in the select gate G1. The large width portion 9*b* is located in the manual mode gate G2. The large width portion 9*b* is formed in an overall area covering the movable regions for the gear shift-up and gear shift-down of the shift lever 1 in the manual mode.

With the shift lever 1 remaining in the select gate G1, the shift lever 1 assumes a position in the narrow width portion 9*a* and moves with the shift lever 1 displaced in the vehicle's longitudinal direction to allow the slide plate 6 to slide in the vehicle's longitudinal direction in the base member 8. When this takes place, since the second slide plate 7 is fitted to the first slide plate 6, the second slide plate 7 slides with the first slide plate 6 in the vehicle's longitudinal direction.

Meanwhile, the second slide plate 7 has a second through-bore 10, formed in a substantially oblong shape at a central area of the plate section 7*a* slidably fitted to the first slide plate 6 through which the shift lever 1 extends. The shift lever 1 extends through both the first through-bore 9 of the first slide plate 6 and the second through-bore 10 of the second slide plate 7 fitted to the first slide plate 6. The second through-bore 10 has a width in the vehicle's longitudinal direction that substantially matches a width of the large width portion 9*b* of the first slide plate 6. Therefore, no probability takes place for the shift lever 1 to move the slide plates 6, 7 in the vehicle's longitudinal direction during operation (that is, for gear shift-up and gear shift-down) of the shift lever 1 within the manual mode gate G2.

Further, the plate section 7*a* has a side edge, formed on a vehicular left side (at a position closer to the indicator), whose central area is formed with an arm 7*b* that protrudes in a direction (here, in an upward direction) in which the shift lever 1 extends. The arm 7*b* has an upper end to which the display portion 5 is joined 15 for clear indication of the select position on the window 4 of the indicator D. A red-colored sticker is attached onto an upper surface of the display portion 5. A position, in which the red color on the upper surface of the display portion 5 is visible through the window portion 4, is clearly indicated as the select position of the shift lever 1. The arm 7*b* is formed with a slit 7*c* that extends in a vertical direction.

The slit 7*c* extends through the arm 7*b* in the vehicle's lateral direction (that is, in a thickness direction).

In addition, the slit 7*c* is formed for the purpose that will be described below in detail.

Further, the plate section 7*a* and the arm 7*b* have a joint section from which a guide member 11 protrudes downward. The guide member 11 includes a long plate-like element/plate element 50 that extends in the vertical direction and vehicle's longitudinal direction. Furthermore, the guide member 11, made of material such as synthetic resin having elasticity, can be reliably restored to its original position even if flexed in the vehicle's lateral direction. In such a way, the guide member 11 has flexibility.

Figure 3:
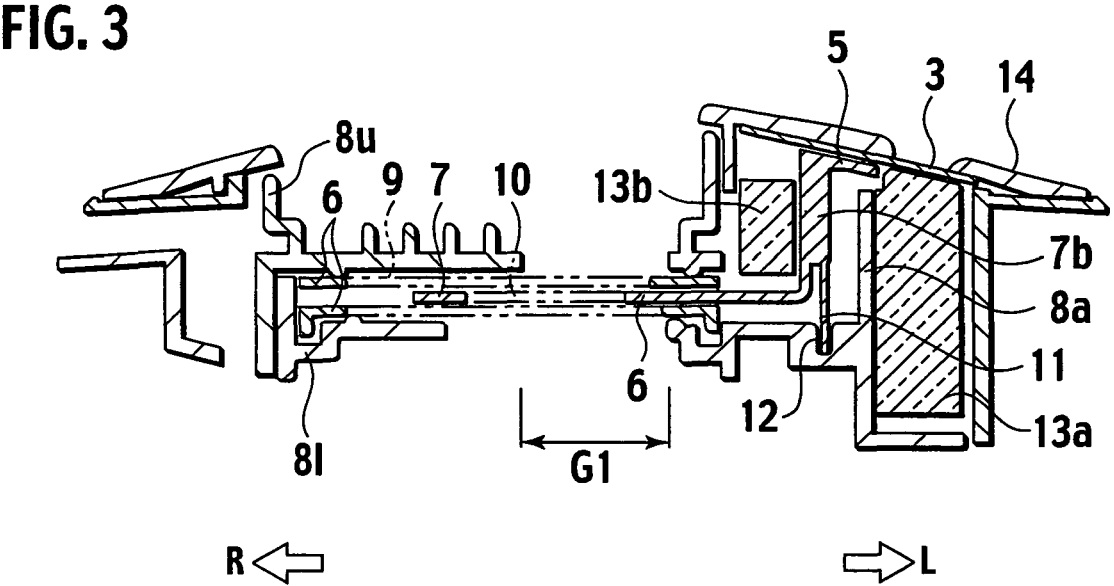
FIG. 3 is a cross sectional view of the AT selector cover of one embodiment according to the present invention with a shift lever placed in a select gate.
Figure 4:
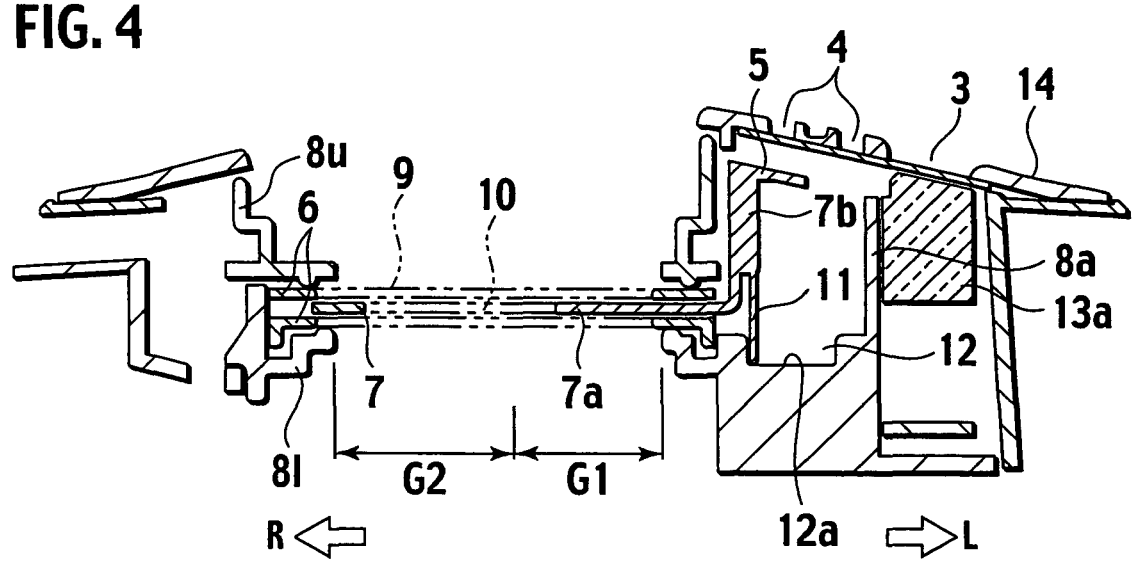
FIG. 4 is a cross sectional view of the AT selector cover of one embodiment according to the present invention with the shift lever placed in a manual mode gate.

Moreover, a guide recess 12 is formed on an upper surface of the base floor 8*l*, forming the base member 8, in the vehicle's longitudinal direction. The first and second slide plates 6, 7 are assembled to the base member 8 in a structure of which cross sectional view is shown in FIGS. 3 and 4. FIG. 3 shows a status with the shift lever 1 remaining in the select gate G1, and FIG. 4 shows a status with the shift lever 1 remaining in the manual mode gate G2.

As shown in FIG. 3, the guide member 11 has a distal end inserted to an inside of the guide recess 12. The guide recess 12 is formed in a narrow width in the vehicle's lateral direction. Thus, with the distal end of the guide member 11 inserted to the guide recess 12, the movements of the guide member 11 in the vehicle's lateral direction is restricted. During running of the vehicle, therefore, such restriction suppresses the second slide plate 7, coupled to the guide member 11, from vibrating (especially vibrating in the vehicle's lateral direction).

As shown in FIG. 4, further, the guide member 11 is formed in a length to reach a bottom surface 12*a* of the guide recess 11. Consequently, in a case where the guide member 11 moves in the vehicle's longitudinal direction, a bottom edge of the guide member 11 is held in sliding engagement with the bottom surface 12*a* of the guide recess 12. Such sliding engagement precludes the vibration of the second slide plate 7. This precludes the interference between the second slide plate 7 (and the display section 5) and a peripheral component part, thereby suppressing the occurrence of abnormal noise such as clacking. The peripheral component part includes, for instance, light guide sections 13a, 13b and a light shielding plate 8a of the base floor 8l placed by the sides of the light guide sections 13a, 13b.

In addition, the guide recess 12 has an end portion (see FIG. 4), placed on a rear side of the vehicle, which is formed in an increased width in the vehicle's lateral direction. Such an end portion is formed for the shift lever 1 to move in the vehicle's lateral direction during a shift from the automatic mode to the manual mode while permitting the guide member 11 to move in the vehicle's lateral direction with the shift lever 1. Even with such a portion, the guide member 11 stays in the guide recess 12, thereby preventing the interference between the component part, disposed outside the guide recess 11, and the peripheral component part of the second slide plate 7 (and the display portion 5).

As set forth above, with the present embodiment, the slit 7c is formed along the arm 7b in the vertical direction. With the slit 7c, the arm 7b has flexibility. The shift lever 1 has looseness (allowance) in a slight degree when placed in the select gate G1. In addition, the shift lever 1 has looseness (allowance) even in a leftward direction and a rightward direction of the vehicle when placed in the manual mode gate G2. With the shift lever 1 operatively moved in the vehicle's lateral direction within a range with such looseness, there is a fear with the guide member 11 dislocated from the guide recess 12.

Figure 5:
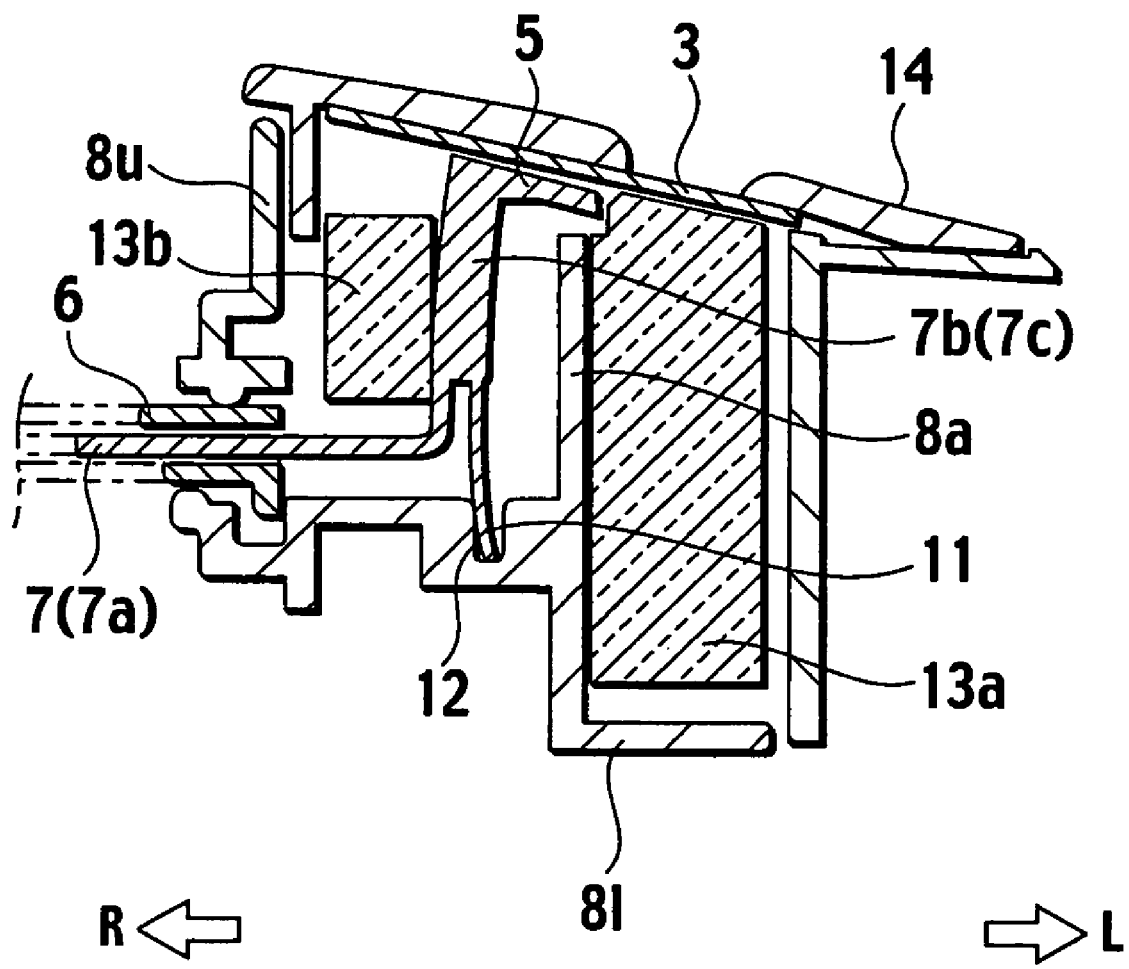
FIG. 5 is a cross sectional view showing a guide member and an arm under flexed states, respectively.

However, with the present embodiment, the guide member 11 per se has flexibility and the slit 7c allows the arm 7b to have flexibility. Accordingly, as shown in FIG. 5, even under a situation where the second slide plate 7 is applied with load acting in the vehicle's lateral direction, the guide member 11 is flexed and does not come free from the guide recess 12. Moreover, in the event that the guide member 11 comes free from the guide recess 12, the guide member 11 can be easily restored to the inside of the guide recess due to restoring forces resulting from the flexing of the guide member 11 and the flexing of the arm 7b.

Meanwhile, since the upper end portion of the arm 7b acts as the display portion 5 and the arm 7b needs to be reliably retained in a given position, rigidity of the arm 7b in the vehicle's lateral direction should be maintained in a value exceeding a given value. Therefore, the present invention is implemented in a structure to allow the arm 7b to be kept in a given position and available to be flexed when applied with load in the vehicle's lateral direction.

Moreover, although the guide member 11 and the guide recess 12 are hard to suppress the vibrations in the vehicle's lateral direction, the first and second slide plates 6, 7 originally play roles as component parts slidable in the vehicle's longitudinal direction with no occurrence of interference with another component part, giving no problems. In addition, with the present embodiment, the distal end of the guide member 11 is held in abutting engagement with the bottom wall of the guide recess 12. Therefore, the vibration of the guide member 11 is further restricted, thereby further restricting the generation of interfering noise. The reduction in vibration due to the abutting engagement between the distal end of the guide member 11 and the bottom wall of the guide recess 12 provides an effect of suppressing the vibration in the vehicle's lateral direction. This results in a capability of suppressing the vibration of the second slide plate 7 in an area inside the first slide plate 6.

The present invention is not limited to the embodiment set forth above. For instance, with the present embodiment described above, the guide recess 12 has the bottom surface 12a and the distal end of the guide member 11 is held in abutting engagement with the bottom surface 12a of the guide recess 12.

However, in view of a structure wherein the guide member 12 guides the guide member 11 and the second slide plate 7, the guide recess 12 may have no bottom surface 12a and no distal end of the guide member 11 needs to be held in abutting engagement with the bottom surface.

The entire contents of a Patent Application No. P2005-340998 with a filing data of Nov. 25, 2005 and a Patent Application No. P2006-249868 with a filing data of Sep. 14, 2006 in Japan are herein incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An AT selector cover comprising:
a base member having a select gate for an automatic mode and a manual mode gate formed along a vehicle's longitudinal direction;
a first slide plate held on the base member for sliding capability in the vehicle's longitudinal direction and movable with a shift lever displaced in the select gate;
a second slide plate held on the first slide plate for sliding capability in a vehicle's lateral direction and movable with the shift lever displaced in the vehicle's lateral direction; and
an indicator providing a clear indication on a select position of the shift lever on a side area of the select position;
wherein the shift lever is capable of shifting between the select gate of the automatic mode and the manual mode gate,
wherein the second slide plate has a guide member, protruding toward the base member and protruding downward, the base member having a guide recess for guiding the guide member, movable with the shift lever, which is inserted into the guide recess, wherein the guide recess has a width defined by side walls on which the guide member can slide as the guide member moves in the vehicle's longitudinal direction,
wherein the second slide plate has a plate section slidable in the first slide plate in the vehicle's lateral direction, and an arm coupling the plate section and a display section of the indicator to each other,
wherein at least one of the arm and the guide member has flexibility, and
wherein the guide member has a distal end and a lower end held in abutting engagement with a bottom surface of the guide recess.

2. The AT selector cover according to claim 1, wherein:
the arm is formed with a slit to allow the arm to have flexibility.

3. The AT selector cover according to claim 1, wherein:
the guide member includes a plate element extending in a vehicle's vertical direction and the vehicle's longitudinal direction and having the flexibility to allow the guide member to have the flexibility.

4. The AT selector cover according to claim 1, wherein the distal end of the guide member held in abutting engagement with the bottom surface of the guide recess is held such that vibration of the second slide plate is restricted.

5. The AT selector cover according to claim 4, wherein the arm is formed with a slit to allow the arm to have flexibility.

6. The AT selector cover according to claim 1, wherein the distal end faces in a direction opposite, with respect to a vehicle's vertical direction, of the indicator.

7. The AT selector cover according to claim 1, wherein the distal end faces downward with respect to a vehicle's vertical direction.

8. The AT selector cover according to claim 1, wherein the guide member extends downward, with respect to the vehicle's vertical direction, into the guide recess.

9. The AT selector cover according to claim 1, wherein the AT selector cover includes a display portion visible through at least one window of the indicator, wherein the display portion has a distinct physical solid geometry that is different from that of the guide member and is spatially separated by a distance from the guide member.

10. The AT selector cover according to claim 1, wherein the AT selector cover is configured such that movement of the guide member along the guide recess results in an interference fit between the guide member and an interior of the guide recess.

11. The AT selector cover according to claim 1, wherein the AT selector cover is configured such that movement of the guide member in the vehicle's lateral direction causes the guide member to flex such that the guide member does not leave the guide recess.

12. The AT selector cover according to claim 1, wherein the guide member includes a length, a width and a thickness, wherein the width and the thickness lie on a plane normal to the length, wherein the thickness is less than the length, and wherein the distal end is at a location along the length after which no more material of the guide member is present.

13. The AT selector cover according to claim 12, wherein the distal end faces in a direction opposite, with respect to a vehicle's vertical direction, of the indicator.

14. The AT selector cover according to claim 12, wherein the distal end faces downward with respect to a vehicle's vertical direction.

15. The AT selector cover according to claim 12, wherein the guide member extends downward, with respect to the vehicle's vertical direction, into the guide recess.

16. The AT selector cover according to claim 12, wherein the AT selector cover includes a display portion visible through at least one window of the indicator, wherein the display portion is different from the guide member.

17. The AT selector cover according to claim 1, wherein the guide member includes a protrusion that protrudes, with respect to the vehicle's vertical direction, downward, wherein the protrusion is more narrow in thickness with respect to its length, its length being measured in the direction of the protrusion, and wherein the distal end of the guide member is located at a terminus of the protrusion.

18. The AT selector cover according to claim 1, wherein the distal end of the guide member does not contact the arm.

\* \* \* \* \*